June 5, 1923.
C. ESCHER
TIRE
Filed April 21, 1922
1,458,040
2 Sheets-Sheet 1
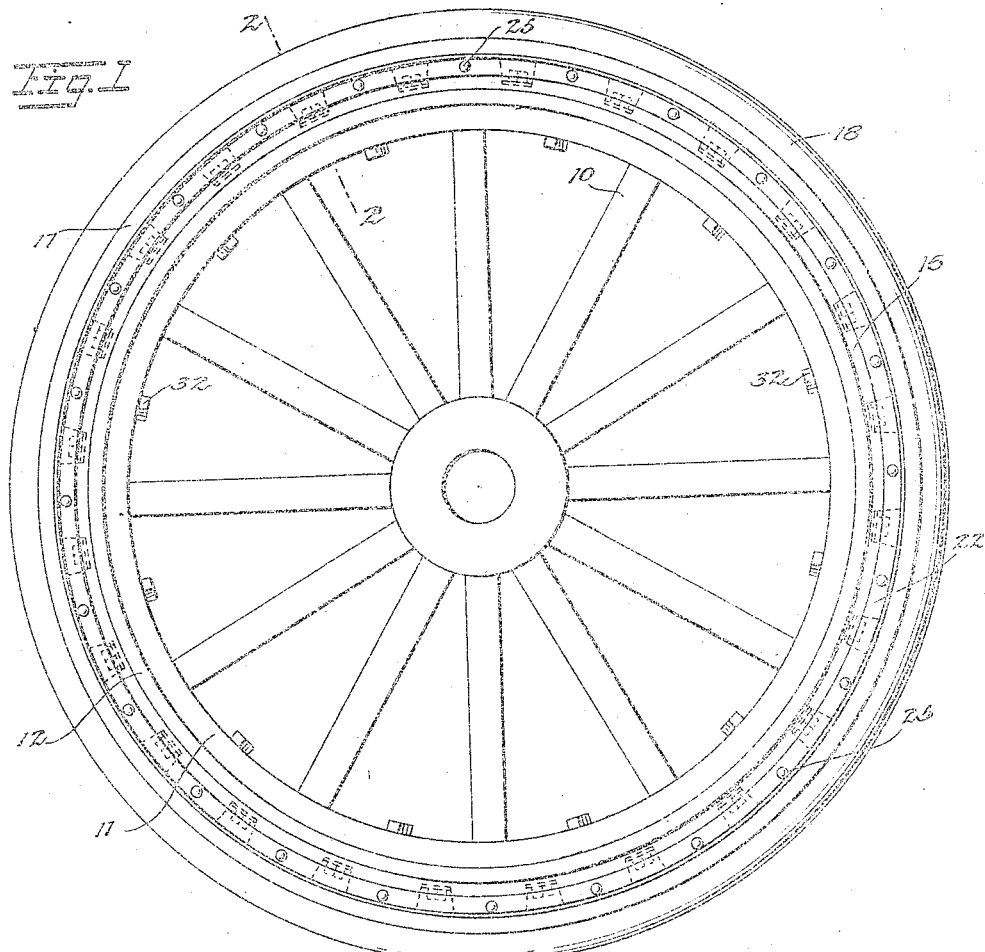
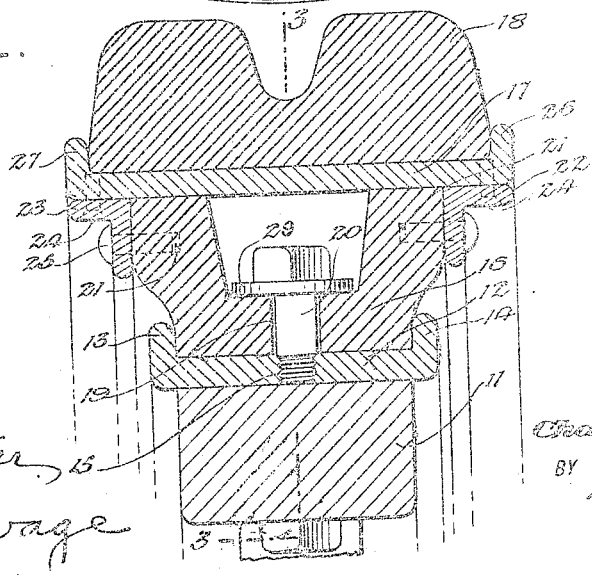
WITNESSES
H. T. Walker
C. W. Savage
INVENTOR
Charles Escher
BY
ATTORNEYS

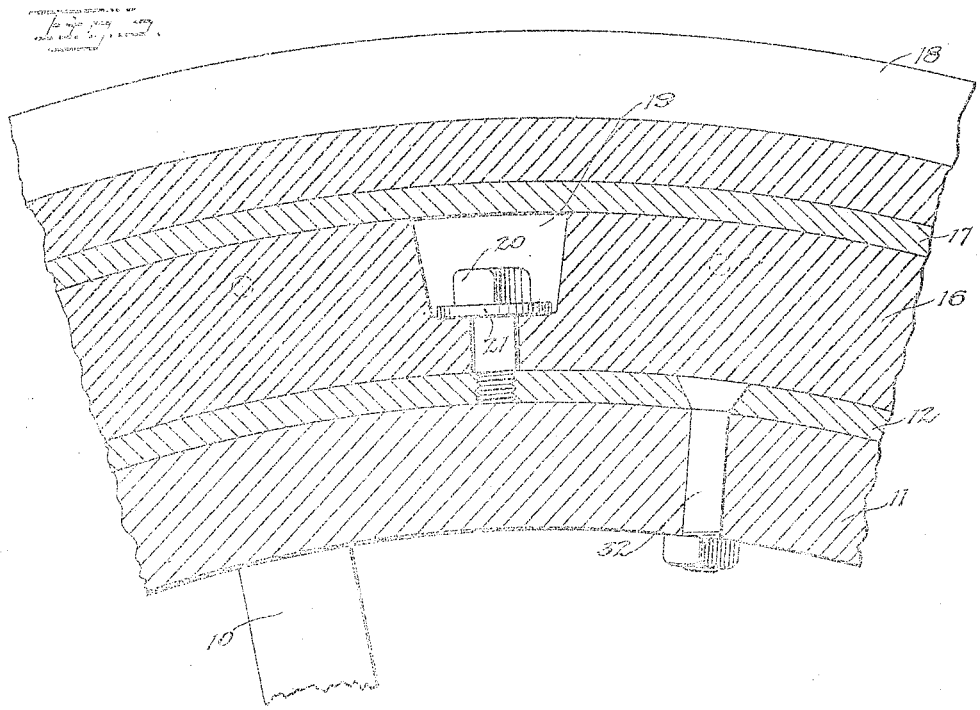
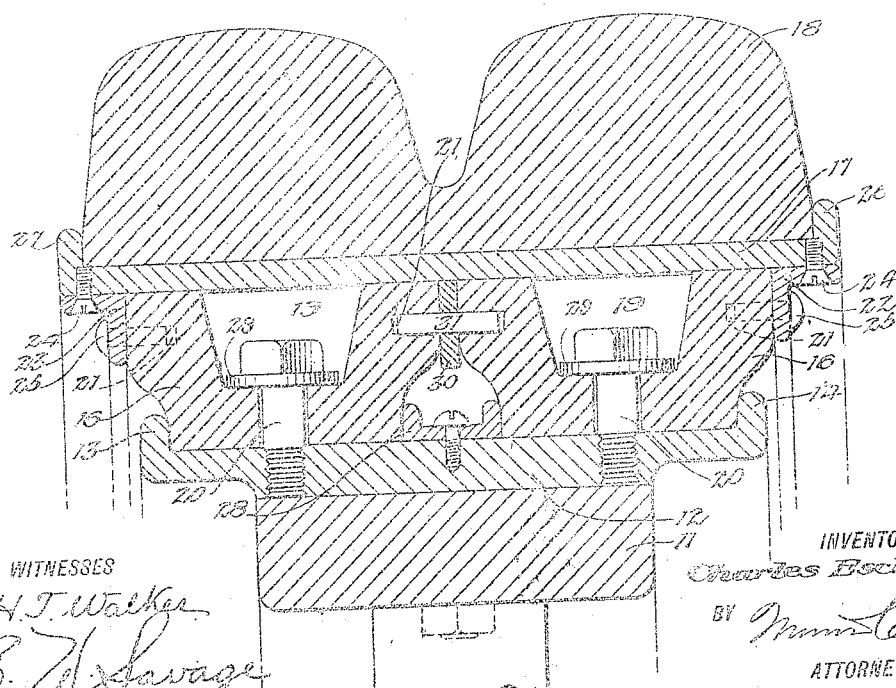

UNITED STATES PATENT OFFICE.

CHARLES ESCHER, OF JERSEY CITY, NEW JERSEY.

TIRE.

Application filed April 21, 1922. Serial No. 555,815.

*To all whom it may concern:*

Be it known that I, CHARLES ESCHER, a citizen of the United States, and a resident of Jersey City, in the county of Hudson and State of New Jersey, have invented new and useful Improvements in Tires, of which the following is a full, clear, and exact description.

This invention relates to improvements in tires for mounting on vehicle wheels or demountable rims for vehicle wheels and is an improvement over my copending application, Serial No. 522,101, filed December 13, 1921.

The general object of this invention is the provision of a cheap, durable and simply constructed resilient tire.

A further object of the invention is the provision of a tire in which the rim members and the cushion members are positively attached to one another so as to eliminate all creeping of one with respect to the other.

Another object is the provision of a resilient tire, the cushion means of which is provided with braced walls which serve to hold the outer rim against rocking on the cushion.

These objects are accomplished by providing an inner rim, a cushion positively attached to said inner rim, an outer rim positively attached to said cushion and forming the cushion with walls flaring outward from the inner face so as to provide bracing members adapted to support the outer rim against rocking.

These and other objects of the invention will be more clearly understood from the following detailed description and accompanying drawings.

Figure 1 is a side elevation of a vehicle wheel with the tire mounted thereon;

Figure 2 is a section along the line 2—2, Figure 1;

Figure 3 is a section along the line 3—3, Figure 2;

Figure 4 is a section of a modification showing more than one cushion mounted on the inner rim.

Referring to the above-mentioned drawings, a vehicle wheel 10 provided with a wheel felly 11 is shown. An inner rim 12 is mounted on the wheel felly 11. This inner rim may be either fixed to the wheel felly by bolts 32 as shown in Figure 3, or it may be constructed in the form of a demountable rim, well known in automobile construction. Flanges 13 and 14 are formed on the inner rim 12 and extend outward. The inner rim 12 is also provided with a plurality of threaded openings 15 which extend radially.

An annular cushion 16, the walls of which flare outward from the inner face, is provided with a plurality of countersunk openings 19 which extend through the same. This annular cushion is mounted on the inner rim 12 and is positively attached to the same by screw bolts 20 which have washers 29 interposed between their heads and the annular cushion so as to give a larger gripping surface and preventing the possibility of the bolt heads being pulled completely through the openings. Openings 21 extend laterally into the cushion 16. An outer rim 17 is mounted on the cushion 16 and held against lateral movement by the annular flange members 22 and 23, which are detachably mounted on the inner face of the outer rim 17 by means of screws 24. Projecting through the annular flanges into the openings 21 in the cushion are bolts 25 which retain the outer rim against circumferential movement on the cushion. Flanges 26 and 27 extending outward are provided integral with the outer rim 17 and serve to hold the tread 18 in position on the outer rim.

A modification of the invention is shown in Figure 4. In this case a plurality of cushions 16 are mounted on the inner rim 12. An annular channel member 28 is mounted on the inner rim 12 between the bases of the annular cushions 16, serving to keep them spaced. Mounted between the outer meeting edges of the annular cushions is a ring 30 carrying a plurality of studs 31 which engage in the openings 21 in the annular cushions and serve to prevent relative movement between the cushions. The remainder of the construction is the same as set forth above, the annular flange members 22 and 23 being provided for removable mounting on the outer rim 17 to connect the outer rim and the cushions so as to prevent relative movement between these members.

I would state in conclusion that while the illustrated examples constitute practical embodiments of my invention, I do not limit myself strictly to the exact details herein illustrated since manifestly the same can be considerably varied without departing from the spirit of the invention as defined in the appended claims.

Claims:

1. In a tire of the class described including an annular cushion, an outer rim mounted on the annular cushion and annular flanges attached to said outer rim to retain it against lateral movement on the cushion, and studs carried by the annular flanges engaging the annular cushion to prevent circumferential movement of the rim relative to the cushion.

2. As a new article of manufacture, a tire assemblage of the class described, comprising an inner rim, a tire for mounting on said inner rim including an annular cushion provided with countersunk openings extending radially inward through said cushion, screw bolts for mounting in said countersunk openings to attach the cushion to said inner rim, an outer rim mounted on said cushion, means provided in conjunction with said outer rim for engaging the annular cushion to prevent lateral or circumferential movement of the rim relative to the cushion, and a tread carried by said outer rim.

3. As a new article of manufacture, a tire assemblage of the class described, comprising an inner rim having threaded openings extending radially through the same, a tire for mounting on said inner rim comprising a cushion having a plurality of countersunk openings extending inward from the outer face, screw bolts for projecting through said countersunk openings and engaging in the threaded openings in said inner rim to attach the cushion to the inner rim, an outer rim mounted on said annular cushion, means mounted on said outer rim and engaging the annular cushion to prevent lateral movement of the rim on the cushion, means provided in conjunction with said means for preventing lateral movement to engage the cushion to prevent circumferential movement of the rim relative to the annular cushion, and a tread mounted on said outer rim.

4. As a new article of manufacture, a tire assemblage of the class described, comprising an inner rim having a plurality of threaded openings extending through the same; a tire for mounting on said inner rim including an annular cushion having a plurality of countersunk openings extending radially inward through the cushion, screw bolts for projecting through said countersunk openings to engage in the threaded openings in the inner rim to attach the annular cushion to said rim, an outer rim mounted on said annular cushion annular flange members for removably mounting on said outer rim to prevent lateral movement of the outer rim on the annular cushion, means provided in conjunction with said annular flange members to engage the annular cushion to prevent circumferential movement of the outer rim with respect to the annular cushion, and a tread carried by said outer rim.

5. As a new article of manufacture, a tire of the class described for mounting on wheel rims, comprising an annular cushion having countersunk openings extending radially inward through the same, screw bolts for mounting in said countersunk openings to attach the cushion to a wheel rim, an outer rim mounted on said annular cushion, annular flange members removably attached to said outer rim for holding the outer rim against lateral movement on the cushion, means in conjunction with said annular flange members for engaging the annular cushion to prevent circumferential movement of the outer rim on the cushion, and a tread carried by said outer rim.

6. As a new article of manufacture a tire assemblage of the class described comprising a wheel rim having threaded openings extending through it, an annular cushion, the sides of which flare outward from the inner face, provided with a plurality of countersunk openings extending radially through the same, screw bolts mounted in said countersunk openings engaging in the threaded openings attaching the cushion to the rim, an outer rim mounted on said annular cushion, annular flange members removably mounted on the outer rim to retain it against lateral movement on the cushion, bolts projecting through said annular flange members engaging the cushion to prevent circumferential movement of the outer rim on said annular cushion, and a tread mounted on said outer rim.

7. As a new article of manufacture, a tire assemblage of the class described, comprising an inner rim having a plurality of threaded openings extending through it, a plurality of annular cushions having countersunk openings extending along radial lines through them mounted on the inner rim, a ring mounted on the inner rim between the annular cushions for spacing them, screw bolts mounted in said countersunk openings and engaging in the threaded openings in the inner rim to attach the annular cushions to said rim, an outer rim mounted on said annular cushions, annular flange members removably attached to said outer rim to retain it against lateral movement on the annular cushions, means in conjunction with the annular flanges for engaging the annular cushions to prevent circumferential movement between said rim and cushions, and a tread located on the outer rim.

8. As a new article of manufacture, a tire assemblage of the class described, comprising an inner rim having a plurality of threaded openings extending through it, a tire for mounting on said inner rim comprising a plurality of annular cushions having side walls flaring outward from the inner face and having a plurality of countersunk openings extending radially therethrough, screw bolts projecting through said countersunk openings and engaging in said threaded openings in the inner rim attaching the cushions to said rim, an annular channel member mounted on said inner rim between the bases of said annular cushions for spacing them, and an annular ring mounted between the inner edges of said annular cushions, studs carried by said annular ring engaging said annular cushions to prevent movement of one relative to the other, an outer rim mounted on said cushions, annular flange members removably attached to said outer rim for retaining said rim from lateral movement with respect to the cushions, and means in conjunction with said annular flange members for engaging the cushions to prevent circumferential movement of the outer rim on said cushions, and a tread carried by the outer rim.

CHARLES ESCHER.